United States Patent [19]

Potier

[11] Patent Number: 5,101,889
[45] Date of Patent: Apr. 7, 1992

[54] HEAT EXCHANGER U-BEND DIPPED JOINT WITH VENT FOR CLEARANCE SPACE

[75] Inventor: Michel Potier, Rambouillet, France

[73] Assignee: Valeo Thermique Moteur, Le Mesnil-St-Denis, France

[21] Appl. No.: 615,241

[22] Filed: Nov. 19, 1990

[30] Foreign Application Priority Data

Nov. 22, 1989 [FR] France .................. 89 15309

[51] Int. Cl.⁵ .................. F28D 1/047; B23K 31/02
[52] U.S. Cl. .................. 165/150; 29/890.043; 228/154; 228/173.4; 228/183; 285/287
[58] Field of Search ............ 228/165, 183, 154, 173.4; 29/890.036, 890.043, 890.054; 165/150, 173; 285/157, 287

[56] References Cited

U.S. PATENT DOCUMENTS

| | | | |
|---|---|---|---|
| 3,048,104 | 8/1962 | Riggs | 228/165 |
| 3,347,728 | 10/1967 | Preotle et al. | 156/283 |
| 3,760,481 | 9/1973 | Greever | 29/890.043 |
| 3,833,986 | 9/1974 | Decicco | 228/183 |
| 3,957,289 | 5/1976 | Kilgore et al. | 285/22 |
| 4,076,167 | 2/1978 | Wright | 228/173.4 |
| 4,077,559 | 3/1978 | Watson, Jr. | 228/154 |

FOREIGN PATENT DOCUMENTS

| | | | |
|---|---|---|---|
| 3413999 | 11/1985 | Fed. Rep. of Germany . | |
| 20687 | 6/1973 | Japan | 228/183 |
| 23244 | 2/1979 | Japan | 29/890.043 |
| 114596 | 9/1981 | Japan | 228/183 |
| 804298 | 2/1981 | U.S.S.R. | 228/165 |
| 468749 | 7/1937 | United Kingdom | 285/287 |

*Primary Examiner*—John Rivell
*Assistant Examiner*—L. R. Leo
*Attorney, Agent, or Firm*—Dennison, Meserole, Pollack & Scheiner

[57] ABSTRACT

A heat exchanger, in particular for an automotive vehicle, includes a bundle of tubes with a plurality of assemblies of first tubular elements with second tubular elements, so as to constitute a continuous circuit for circulation of fluid within the heat exchanger. One of the tubular elements has a portion which is polygonal in cross section and which is telescoped or mated with the other one of the tubular elements of the same assembly, this other tubular element being circular in cross section.

9 Claims, 2 Drawing Sheets

HEAT EXCHANGER U-BEND DIPPED JOINT WITH VENT FOR CLEARANCE SPACE

FIELD OF THE INVENTION

This invention relates to a heat exchanger of the kind having an assembly of tubular elements telescoped or mated with each other, in particular for automotive vehicles.

BACKGROUND OF THE INVENTION

It is known from the German patent specification DE-3413999A, published on 7 Nov. 1985, to provide a heat exchanger in which a bundle of finned tubes includes first tubular elements comprising a series of groups of tubes, either straight or of hairpin configuration, with the groups of tubes being connected together through a second tubular element. These second tubular elements are in the form of bent tubes which define a coupling bend, so that a sealed path is defined for fluid circulating in the tube circuit thus constructed.

Such a heat exchanger may be used for the circulation of a refrigerant fluid in a heat exchanger of the phase change type, such as an evaporator or a condensor, especially in apparatus for the air conditioning of automotive vehicles.

As is mentioned in the German patent specification mentioned above, in order to ensure that the assembly of tubes and bends is sealed, a sealing joint is provided between the mating tubular elements, for example a brazed joint. For this purpose, the straight end portions of the bends are inserted into the open ends of the tubes in the corresponding groups of tubes, to which they are then secured in a sealing manner by means of a brazing operation, for example by being passed through a bath of brazing material which allows the latter to come into contact with the ends of the groups of tubes, between the outer walls of the straight end portions of the bends and the internal walls of the corresponding groups of tubes. These walls are generally expanded, in such a way as to give them a larger diameter than the outer wall of the straight end portions of the bend. This creates the space into which the braze metal can penetrate.

A problem does however remain, namely how to avoid any possible air bubbles being trapped between the telescoped portions at the open ends of the groups of tubes during the penetration of the braze metal into the interspace. The patent specification mentioned above proposes to provide two diametrically opposed vents on the straight end portions of the bend. These vents are defined by partial radial recesses or dimples which are formed in the walls of the straight end portions of the bends. They extend axially so as to bring the expanded open end of each tube in the groups of tubes into communication with the assembly between the straight end portions of the bends and the portion of the tube of each group situated beyond the assembly of the bend with the tube. In this way, the air trapped between the cooperating portions of the bend/tube assembly and the braze metal penetrating into the open end of the tube is able to escape freely through these vents.

Even so, the arrangement of the vents mentioned above still has some drawbacks. Because the vents extend into the interior of the bend, they cause some disturbance in the circulation of the refrigerant fluid circulating in the circuit, and so diminish the performance of the heat exchanger. In addition, there are two vents which prove insufficient, because air bubbles may exist in regions which are remote from the vents and which become trapped again between the walls of the tubes and bends and the braze metal.

SUMMARY OF THE INVENTION

The present invention proposes a remedy for the drawbacks mentioned above, in the form of a heat exchanger comprising an assembly of bend and tube such as to allow any possible bubbles occurring within the assembly to be evacuated totally.

In accordance with the invention, a heat exchanger, in particular for automotive vehicles, comprising a bundle of finned tubes forming part of a plurality of assemblies of tubular elements, the said assemblies being formed by telescoping or mating one of the tubular elements into the other and by forming a non-removable joint between the said elements, is characterised in that one of the tubular elements has a portion of polygonal cross section which is telescoped with the other corresponding tubular element, the latter having a circular cross section.

By virtue of the invention, during assembly of the bends with the tubes, a multiplicity of channels for evacuation of air are created at the level of the assembled elements, and these channels have no harmful effect on the free circulation of the refrigerant fluid within the circuit of tubes thus formed. In addition, air bubbles are able to be evacuated while being regularly distributed circumferentially.

The other advantages and features of the invention will appear more clearly from the following description, which is given by way of example and with reference to the accompanying drawings.

DESCRIPTION OF PREFERRED EMBODIMENTS OF THE INVENTION

Figure 1:
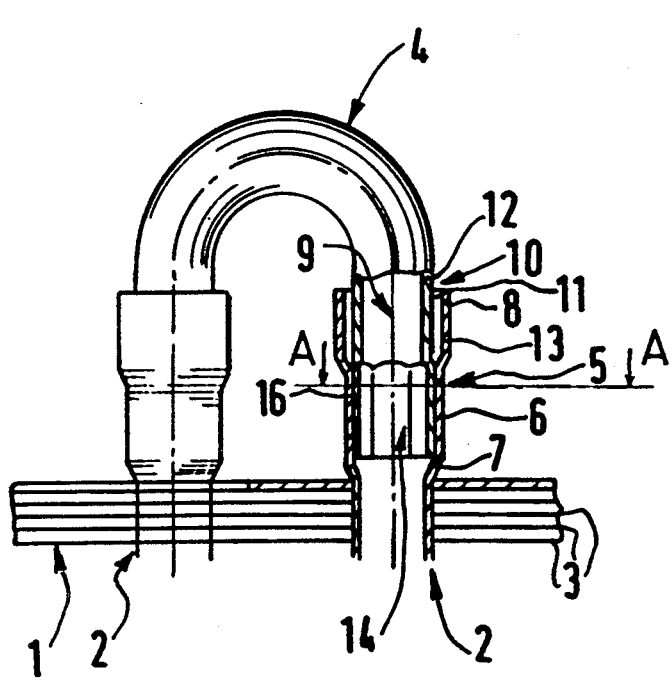
FIG. 1 is a diagrammatic partial view of a heat exchanger.

Referring to FIG. 1, this shows a heat exchanger, typically a heat exchanger for circulation of a phase change fluid, of the kind more commonly referred to as an evaporator or condenser. This heat exchanger comprises a bundle 1 of tubes 2 having fins 3, the bundle including groups of tubes 2, each of which may consist of only two tubes which may for example be bent back on themselves in the form of a hairpin, or it may comprise pairs of tubes. The tubes in each group are connected together through U-shaped bent tubes 4, which are referred to as "bends" in the rest of this description.

For the purposes of the remainder of the present description, it is assumed that the first tubular element comprises the tubes 2, and that the second tubular element comprises the bends 4, though the opposite may alternatively be true.

The free ends 5 of the groups of tubes 2 are so shaped in the region of their mouths as to have a first expanded portion 6 defining a conical shoulder 7, and leading into a second expanded portion 8, the diameter of which is greater than that of the first expanded portion 6. The second expanded portion opens out in the mouth of the free end 5.

In order to assemble the tubular elements comprising firstly the groups of tubes 2 and secondly the straight portions 9 of the bends 4, each free end 10 of the bends 4 is inserted into the free end 5 of a corresponding one of the tubes 2, in such a way that the mouth portion of the free end 10 comes into engagement on the conical shoulder 7 of the first expanded portion 6. During this insertion, the free ends 10 of the bends 4 are fitted into the first expanded portion 6. A free space 11, between the outer wall 12 of the straight portion 9 of the bend 4 and the internal wall 13 of the second expanded portion 8 is thus formed between the cooperating parts of the two tubular elements 2 and 4. This free space 11 is adapted to receive a connecting means for connecting the two tubular elements 2 and 4, for example braze metal which enables the tubular element 2 to be sealingly and non-removably secured to the other tubular element 4.

Figure 2:
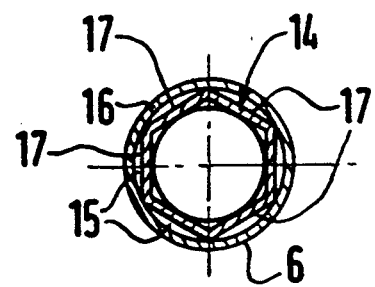
FIG. 2 is a diagrammatic partial view seen in cross section on the line A—A in FIG. 1.
Figure 3:
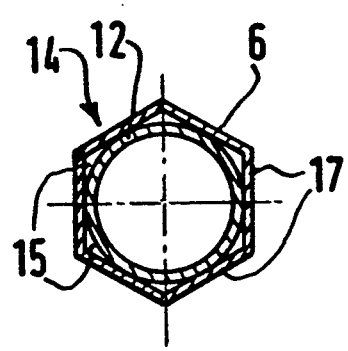
FIG. 3 is a variant on FIG. 2.
Figure 4:
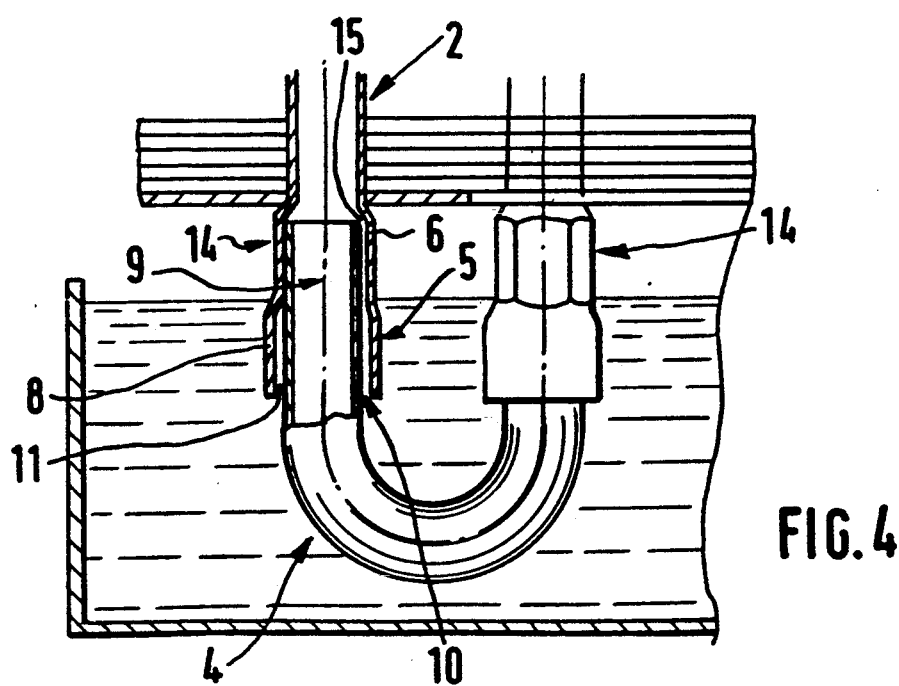
FIG. 4 shows the heat exchanger while it is being connected non-removably.

As is best seen in FIG. 2, the free end 10 of each straight portion 9 of the bends 4 has a polygonal portion 14 whereby it is fitted into the first expanded portion 6. In this example the polygonal portion 14 is hexagonal, so as to define a multiplicity of passages 15 between the inner wall 16 of the first expanded portion 6 and the outside of the faces 17 of the hexagonal portion 14. The greatest diametral length of the portion 14 corresponds substantially to the inner diameter of the expanded portion 6. This hexagonal portion 14 is so shaped that the inner diameter of the tube 2 is tangential to the inside of each face 15 of the hexagonal portion, which allows continuity to be obtained between the tube 2 and the portion 14. In one preferred embodiment, the hexagonal portion 14 is arranged at the level of the first expanded portion 6 in the free end 5 of the tube 2, as is best shown in FIGS. 3 and 4. This arrangement enables the operation of forming the hexagonal portion on the free end 10 of the straight portions 9 of the bend 4 to be avoided, and advantage can be taken of the formation of the first expanded portion 6 so as to give it a polygonal shape which, in this example, is hexagonal as indicated at 14.

Thus, and referring more particularly to FIG. 3, passages 15 again exist after the insertion of the free ends 10 of the straight portions 9 of the bend 4, which is therefore of the same cross section as the remainder of the bend, into each free end 5 of the tubes 2 (and more particularly into the hexagonal first expanded portion 6). These passages 15 are defined betweent the exterior of the wall 12 and the interior of each face 17 of the hexagonal portion 14. Similarly, after the insertion operation just mentioned, the space 11 is formed between the outside of the wall 12 of each straight portion 9 of the bend 4 and the inside of the wall 13 of the corresponding second expanded portion 8. This space 11 can again be used for creating a sealing connecting means.

The use of the passages 15 which are thus created will now be described with reference to FIG. 4, which shows one embodiment for applying sealing connecting material in the free space 11. Each bend 4 is assembled with the corresponding group of tubes 2, in such a way that the free ends 10 are telescoped or mated with, and fitted in, the hexagonal portions 14 carried by the first expanded portions 6 of the tubes 2.

After this operation, the resulting fitted sub-assembly is immersed vertically downwards into a bath of braze metal in such a way that the latter is able to penetrate into the space 11. During this movement, as the braze metal begins to penetrate into the space 11, the air lying between the mating parts of the two tubular elements 2, 4 and the braze metal itself is forced outwardly towards the passage 15, and is then able to escape through the latter so that it can then be removed. Therefore, since immersion is total, there is no risk of pockets of air or air bubbles forming in the free space 11.

Figure 5:
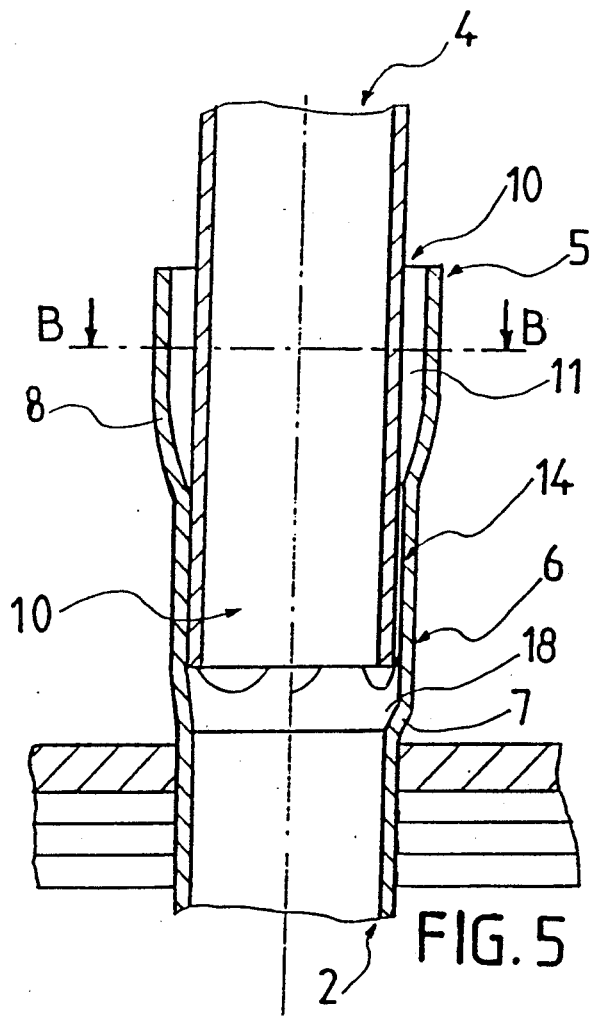
FIG. 5 shows one preferred embodiment of the invention.
Figure 7:
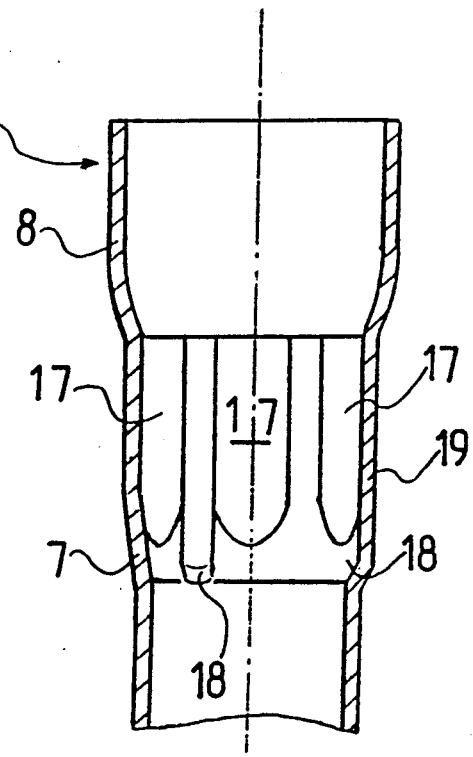
FIG. 7 is a view in partial cross section, taken on the line C—C in FIG. 6 and showing an element of the heat exchanger in accordance with the invention.
Figure 6:
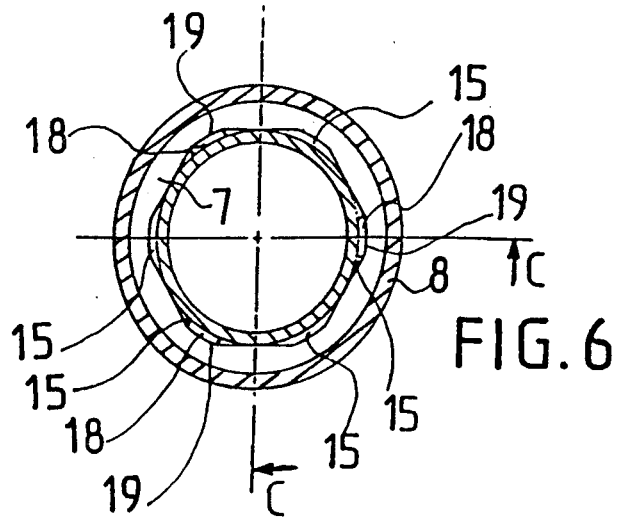
FIG. 6 is a view in partial cross section, taken on the line B—B in FIG. 5.

Reference is now made of FIGS. 5 to 7, which show another example of a preferred embodiment of the invention, and in which the same elements as those described above are again present and carry the same reference numerals. In FIGS. 5 to 7, the portion 14, which is again hexagonal, is carried by the first expanded portion 6 of the end 5 of the tube 2, with this expanded poriton defining a conical shoulder 7 by which it is joined to the remainder of the tube.

As is best seen in FIG. 7, at least one intersection between two consecutive faces 17 of the portion 14 extends into the conical shoulder 7, so as to define a channel 18 in the shoulder.

Preferably, and as is best seen in FIG. 6, the intersections between two consecutive faces 17 of the portion 14 are no longer in the form of sharp edges, but comprise cylindrical wall portions 19 which join the consecutive faces together. There are thus three cylindrical wall portions 19, arranged in this example at 120° from each other, which extend into a conical shoulder 7 so as to define the channels 18. In this way the channels 18 form a continuation of the wall portions 19 into the conical shoulder 7, so that they are spaced apart at regular intervals.

Accordingly, during the fitting of the bend 4 into the tube 2 (FIG. 6), six communicating passages 15 are created, three of which terminate further forward in the direction of the tube bundle through the channels 18. In this way, when the braze metal or other material for creating a sealing joint enters the space 11, generally in the manner described above, the channels 18 assist in the evacuation of the air trapped in the space 11.

The present invention is not limited to the embodiments described, but embraces all variants. In particular, and as mentioned above, the first and second expanded portions may be carried by the straight portions 9 of the bends 4, with the hexagonal portion 14 being in the first expanded portion; and in this case the tube 2 is then circular in cross section.

What is calimed is:

1. A heat exchanger having a bundle of finned tubes comprising a plurality of assemblies of tubular elements, each said assembly including a first tubular element, a second tubular element, the first tubular element being mated with the second tubular element, and a non-removable joint between the first and second tubular elements, wherein one of the tubular elements has a polygonal portion mating with the other tubular element, the other tubular element having a circular cross section, said mating producing a number of spaced individual vent passages.

2. A heat exchanger according to claim 1, wherein each said polygonal portion is of hexagonal cross section.

3. A heat exchanger according to claim 1 or claim 2, wherein the tubular elements of one of said assemblies comprising said first elements and said second elements comprise tubes each having a free end, with each said polygonal portion being formed in a corresponding said free end of a tube.

4. A heat exchanger according to claim 1 or claim 2, wherein the tubular elements in one of the assemblies comprising said first elements and said second elements consist of U-shaped bends, each of which has straight terminal portions, with each said polygonal portion being formed on a corresponding said straight poriton of a bend.

5. A heat exchanger according to claim 1, wherein each tubular element of one of said assembly comprising said first expanded portion, with said polygonal portion being formed in a respective said first expanded portion.

6. A heat exchanger according to claim 1, wherein each tubular element of one of the assemblies comprising said first elements and said second elements has a second expanded portion and a said polygonal portion, with the polygonal portion extending towards a free end of the tubular element through the second expanded portion, the latter being of greater diametral length than the polygonal portion.

7. A heat exchanger according to claim 1, wherein each said polygonal portion is formed on a said tube of the bundle, each tube having a first expanded portion and a shoulder joining the first expanded portion with the remainder of the tube, with consecutive faces of the polygonal portion defining intersections between them, and wherein at least one side intersection extends towards the said shoulder so as to define a channel.

8. A heat exchanger according to claim 7, wherein the intersection of at least two said successive faces of the polygonal portion are joined together through cylindrical wall portions.

9. A heat exchanger according to claim 8, wherein said channel is carried by said wall portion.

* * * * *